US011349789B1

(12) United States Patent
Heffron

(10) Patent No.: US 11,349,789 B1
(45) Date of Patent: *May 31, 2022

(54) SYSTEM AND METHOD FOR CUSTOMIZING ELECTRONIC MESSAGES

(71) Applicant: Wells Fargo Bank, N.A., San Francisco, CA (US)

(72) Inventor: Matthew J. Heffron, Bishop, GA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/948,190

(22) Filed: Sep. 8, 2020

Related U.S. Application Data

(63) Continuation of application No. 14/851,043, filed on Sep. 11, 2015, now Pat. No. 10,771,413.

(51) Int. Cl.
| | | |
|---|---|---|
| H04L 12/58 | (2006.01) | |
| H04L 51/063 | (2022.01) | |
| H04L 51/226 | (2022.01) | |
| G06F 16/9535 | (2019.01) | |
| G06F 16/955 | (2019.01) | |
| H04L 51/56 | (2022.01) | |

(52) U.S. Cl.
CPC .......... *H04L 51/063* (2013.01); *G06F 16/955* (2019.01); *G06F 16/9535* (2019.01); *H04L 51/26* (2013.01); *H04L 51/36* (2013.01)

(58) Field of Classification Search
CPC ....... H04L 51/063; H04L 51/26; H04L 51/36; G06F 16/955; G06F 16/9535
See application file for complete search history.

(56) References Cited

U.S. PATENT DOCUMENTS

| 7,810,713 | B2 | 10/2010 | Lal et al. | |
|---|---|---|---|---|
| 8,712,887 | B2* | 4/2014 | DeGroeve | G06Q 20/40 705/35 |
| 9,092,753 | B1 | 7/2015 | Fanelli | |
| 10,771,413 | B1 | 9/2020 | Heffron | |
| 2004/0117305 | A1* | 6/2004 | Meier | G06Q 20/00 705/40 |
| 2005/0108153 | A1* | 5/2005 | Thomas | G06Q 20/12 705/39 |

(Continued)

OTHER PUBLICATIONS

"U.S. Appl. No. 14/581,043, Decision on Appeal Brief dated Sep. 23, 2019", 2 pgs.

(Continued)

*Primary Examiner* — Benjamin M Thieu
(74) *Attorney, Agent, or Firm* — Schwegman Lundberg & Woessner, P.A.

(57) ABSTRACT

A method may include retrieving document details associated with a user from at least one database stored on a storage device, the document details including a user identifier that identifies the user, a due date, and an amount; querying, using at least one processor, the at least one database using the user identifier to determine at least one value for the user, the at least one value including a historic value; matching the historic value, due date, and amount to an electronic message property set from a plurality of message property sets; applying the electronic message property set to at least one electronic message; and transmitting the at least one electronic message in accordance with the applied property set.

20 Claims, 6 Drawing Sheets

(56) References Cited

U.S. PATENT DOCUMENTS

| | | |
|---|---|---|
| 2006/0247987 A1 | 11/2006 | Busch et al. |
| 2007/0226124 A1 | 9/2007 | Khaghani |
| 2008/0183634 A1 | 7/2008 | Sadler |
| 2008/0293992 A1 | 11/2008 | Ganesan et al. |
| 2009/0150169 A1 | 6/2009 | Kirkwood et al. |
| 2009/0216726 A1* | 8/2009 | Muthaiah ............... G06Q 30/06 |
| 2010/0223557 A1 | 9/2010 | Kenney et al. |
| 2011/0119102 A1* | 5/2011 | Horn .................... G06Q 10/06 705/7.13 |
| 2011/0246268 A1 | 10/2011 | Satyavolu et al. |
| 2012/0116963 A1 | 5/2012 | Klein et al. |
| 2012/0226799 A1 | 9/2012 | Kapur et al. |
| 2013/0066754 A1 | 3/2013 | Atwood |
| 2013/0073386 A1 | 3/2013 | Rose et al. |
| 2013/0179208 A1 | 7/2013 | Chung et al. |
| 2014/0012742 A1 | 1/2014 | Hanson et al. |
| 2014/0096267 A1 | 4/2014 | Casso |
| 2014/0207548 A1 | 7/2014 | Basnight et al. |
| 2014/0337188 A1 | 11/2014 | Bennett et al. |
| 2015/0026058 A1 | 1/2015 | Smith |
| 2015/0186369 A1 | 7/2015 | Yan et al. |
| 2015/0261836 A1 | 9/2015 | Madhani et al. |
| 2016/0071074 A1 | 3/2016 | Baird |
| 2016/0210599 A1 | 7/2016 | Liberi |
| 2016/0025391 A1 | 9/2016 | Fisher |

OTHER PUBLICATIONS

"U.S. Appl. No. 14/851,043, Appeal Brief Based on Pre-Appeal Brief Review filed Nov. 25, 2019", 16 pgs.

"U.S. Appl. No. 14/851,043, Final Office Action dated Mar. 8, 2018", 19 pgs.

"U.S. Appl. No. 14/851,043, Final Office Action dated May 6, 2019", 17 pgs.

"U.S. Appl. No. 14/851,043, Non Final Office Action dated Jul. 27, 2017", 18 pgs.

"U.S. Appl. No. 14/851,043, Non Final Office Action dated Aug. 3, 2018", 15 pgs.

"U.S. Appl. No. 14/851,043, Notice of Allowance dated Apr. 29, 2020", 13 pgs.

"U.S. Appl. No. 14/851,043, Notice of Non-Compliant Appeal Brief dated Dec. 19, 2019", 2 pgs.

"U.S. Appl. No. 14/851,043, Pre-Appeal Brief Request for Review filed Aug. 6, 2019", 6 pgs.

"U.S. Appl. No. 14/851,043, Response filed Feb. 4, 2019 to Non Final Office action dated Aug. 3, 2018", 9 pgs.

"U.S. Appl. No. 14/851,043, Response filed Jun. 8, 2018 to Final Office Action dated Mar. 8, 2018", 10 pgs.

"U.S. Appl. No. 14/851,043, Response filed Oct. 27, 2017 to Non Final Office Action dated Jul. 27, 2017", 11 pgs.

"U.S. Appl. No. 14/851,043, Response to filed Jan. 20, 2020 to Notice of Non-Compliant Appeal Brief dated Nov. 25, 2019", 6 pgs.

\* cited by examiner

SYSTEM AND METHOD FOR CUSTOMIZING ELECTRONIC MESSAGES

CROSS-REFERENCE TO RELATED APPLICATION

This application is a continuation of U.S. patent application Ser. No. 14/851,043, filed Sep. 11, 2015, which is incorporated by reference herein in its entirety.

TECHNICAL FIELD

Embodiments described herein generally relate to transmission of electronic messages and in particular, but not by way of limitation to a system and method for customizing electronic messages.

BACKGROUND

Electronic messages may be transmitted from one entity to another. In some examples, one entity may transmit the same message to thousands of people. In some examples, the message may be transmitted to different types of devices of the user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

In various examples described herein, a custom messaging system generates custom electronic messages (e.g., e-mail, text messages, push messages, messages via one or more apps) based on past characteristics of recipients as well as current and predicted needs of senders. Many existing messaging systems fail to account for these characteristics and transmit the same message to every recipient for every sender. This is in part because existing software does not have ability to gain insight into the characteristics of the senders and recipients such that a custom message may be sent.

Figure 1:
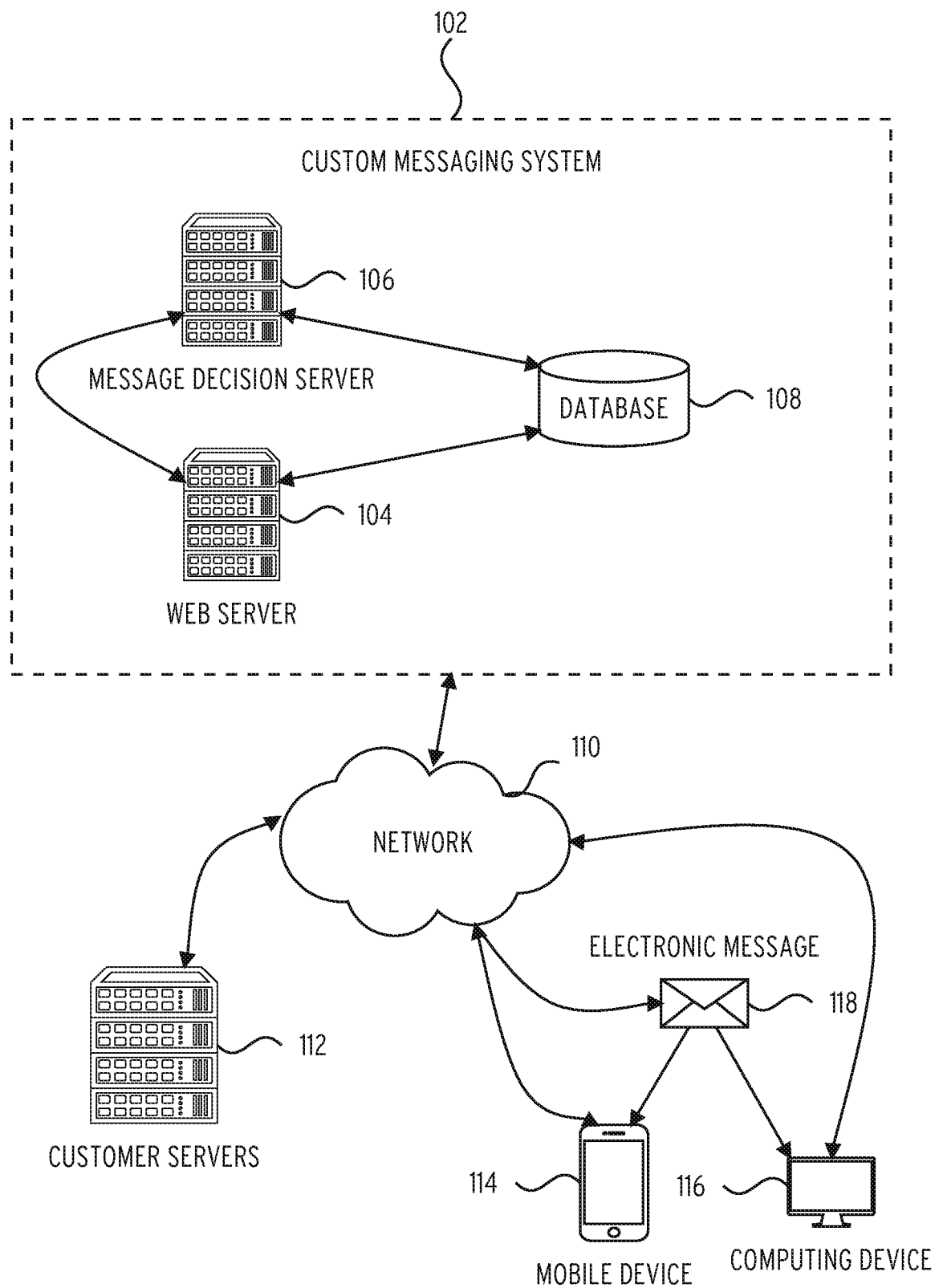
FIG. 1 is a diagram of components associated with a custom message system, according to various examples.

FIG. 1 is a diagram of components associated with a custom messaging system 102. FIG. 1 illustrates the custom messaging system 102, web server 104, message decision server 106, database 108, network 110, customer servers 112, mobile device 114, computing device 116, and electronic message 118.

Although the custom messaging system 102 is illustrated as a combination of web server 104, message decision server 106, and database 108, the custom messaging system 102 may be made up of additional or fewer components. The database 108 may be part of message decision server 106, or the functionality of web server 104 and message decision server 106 may be performed by a single server without departing from the scope of this disclosure. Furthermore, the components of custom messaging system 102 may be in a single geographic location or in a diverse set of locations.

In various examples, customer servers 112 represent one or more computing devices of one or more customers. In an example, a customer is an entity that may utilize the custom messaging system 102. A customer may be a business or an individual. The custom messaging system 102 may provide software for managing receivables of the customer. A customer may in turn have its own customers who use the customer's services. For convenience, and not by way of limitation, the customer's customers will be referred to throughout this disclosure as "users."

The custom messaging system 102 generates at least one electronic message (e.g., electronic message 118) that is transmitted to one or more types of devices such as mobile device 114 (e.g., tablet, mobile phone) or computing device 116 (e.g., laptop, desktop computer) via network 110. One or more property sets may be applied to the electronic message 118. Applying a property set may include settings what messaging address(es) the electronic message 118 is sent to, the number of repetitions of the electronic message 118, the frequency of the repetitions, and the message content. Additional settings may also be included in a property set (see FIG. 3 and accompanying discussion for further details). In an example, electronic message 118 is a message relating to a previous invoice issued by the customer to the user.

Furthermore, while depicted as a single message, the electronic message 118 may in fact be multiple transmissions of the same message content to multiple devices. In another example, multiple messages may be transmitted to the same device. For example, the mobile device 114 may receive an e-mail and a short-messaging-system (SMS) message.

In various examples, the servers and components of the diagram may communicate via one or more networks such as network 110. The network 110 may include one or more of local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 110 may include a single local area network (LAN) or wide-area network (WAN), or combinations of LAN's or WAN's, such as the Internet.

Data used in custom messaging system 102 may be organized and stored in a variety of manners. For convenience, the organized collection of data is described herein as database 108. The specific storage layout and model used in database 108 may take a number of forms indeed, database 108 may utilize multiple models. Database 108 may be, but is not limited to, a relational database (e.g., SQL), non-relational database (NoSQL) a flat file database, object model, document details model, or a file system hierarchy. The database 108 may store data on one or more storage devices (e.g., a hard disk, random access memory (RAM), etc.). The storage devices may be in standalone arrays, part of one or more servers, and may be located in one or more geographic areas.

A database management system (DBMS) may be used to access the data stored within database 108. The DBMS may offer options to search the database 108 using a query and then return data in the database 108 that meets the criteria in the query. For example, a SQL query may be utilized to retrieve all documents for a specific customer or another query may be used to retrieve all documents for a specific user. Another query may retrieve documents that match certain triggers (as discussed further with respect to FIG. 3). The DBMS may operate on one or more of the components of custom messaging system 102 (e.g., message decision server 106).

The customer servers 112 may store data on their respective users in their own databases. In an example, the user data includes information on the services rendered by the customer to the user. The customer servers 112 may store invoice data, payment history, and the total amount of services rendered. Invoice data may in turn include a due date and an amount due to the customer from the user. Additional data may also be stored on the customer servers 112 as described further herein.

In various examples, the custom messaging system 102 communicates with the customer servers 112 via the network 110 using an application programming interface (API). A web server 104 may provide functions such as by implementing a Representational state transfer API (RESTful API) via properly formatted hypertext transfer protocol (HTTP) messages—to directly store data in database 108. Other types of APIs may also be used without departing from the scope of this disclosure. Furthermore, other transfer protocols, including proprietary protocols or direct transfers, may be used to transfer data from customer servers 112 to the custom messaging system 102.

Web server 104 may also accept data that is not properly formatted from customer servers 112. A customer may store user data in a different format or have data organized using a different logical model than that of database 108. In such instances, web server 104 may map the user data received from the customer to the format or model of the user data in database 108.

Although customer servers 112 are depicted as outside custom messaging system 102 customer servers 112 may be part of custom messaging system 102. For example, in addition to providing custom messages, the operator of custom messaging system 102 may also provide payment services for a customer. Thus, the user data for a customer may already be in database 108.

Message decision server 106 may manage the transmission of electronic messages such as electronic message 118 and may include one or more software routines executed by at least one processor to determine: the type of message, the content of the message, the frequency of transmission, the interval between transmission, and the recipients of the message.

Figure 2:
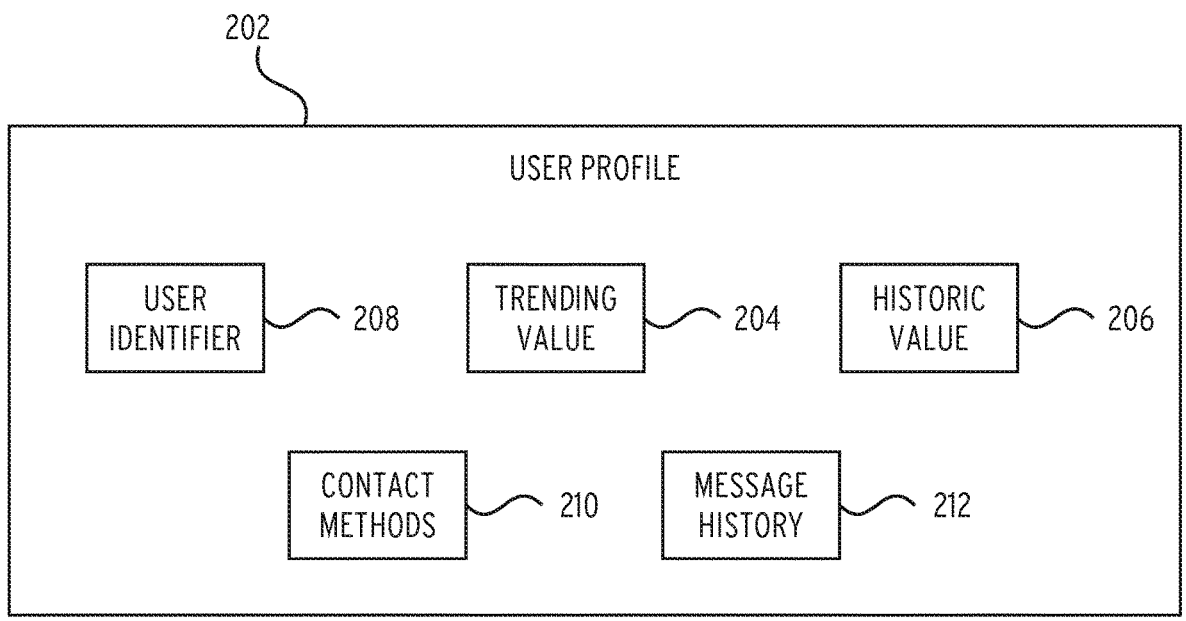
FIG. 2 is a schematic representation of a user profile, according to various examples.

FIG. 2 is a schematic representation of a user profile, according to an example embodiment. In an example, the user profile 202 includes a user identifier 208, a trending value 204, and a historic value 206, contact methods 210, and message history 212. The user profile 202 may be stored as a record in database 108. Database 108 may store a plurality of user profiles. For example, the database 108 may include a set of user profiles for each customer.

The information in user profile 202 may be determined when data is received from customer servers 112 by custom messaging system 102. User data from a customer may include transaction details (e.g., types or descriptions of transactions, dates of services rendered, charged amount, payment histories, paid status of an invoice, etc.) for each user with which the customer has conducted business. The transaction details may be analyzed or queried to determine the information stored in the user profile 202 for a user. The transaction details may originate from, but are not limited to, auction clearing house (ACH) transactions, wire transfers, electronic-bill services.

In an example, the user identifier 208 identifies the user with respect to a customer. The user identifier 208 may be the name of the user as invoiced by a customer or be the account number of the user with respect to a customer. A user profile 202 may include multiple user identifiers if the user is associated with more than one customer.

Contact methods 210 may identify one or more modes of contact for a user. The modes of contact may include, but are not limited to, physical mailing addresses, e-mail addresses, and mobile phone numbers. In various examples, contact methods 210 may also include addresses of contacts related to the user such as a copy contact that receives electronic message 118.

Message history 212 may identify messages that have been transmitted to a user. For example, for each message transmitted to a user, information may recorded in message history 212 that includes, but is not limited to, a message identifier (e.g., an numerical value), the date sent, the contact method used, and the content of the message. Alternatively, the content of the message may not be stored with the message history 212; however, the content may be retrieved by using the message identifier.

There may also be a multiple user profiles for a single user. For example, a user may conduct business with one or more customers. Thus, the database 108 may store a different user profile for each different customer. In an example, a single user profile is stored for the user, but multiple versions of the plurality of values may be stored and associated with the different customers. For example, there may be a different historic value 206 for each customer that the user does business with such as in the following: historic value for customer A; trending value for customer A; historic value for customer B; and trending value for customer B.

Historic value 206 may be a metric that is based on the history of business the user has conducted with a customer (e.g., as received from customer servers 112.) As an illustration, historic value 206 may identify the dollar amount of products or services invoiced by the customer to the user over a time period. The time period may be set according to a preference of the customer and stored in database 108. The historic value 206 may also be based on the total amount of business conducted by a user with a customer.

Historic value 206 may be a relative value compared with other users of the customer. Thus, historic value 206 may be a percentage that identifies where a user ranks in relationship to other users (e.g., a 10% value may mean the user is in the top 10% of dollars spent in a time period). Historic value 206 may represent the percentage of business for the customer (e.g., 5% means 5% of all business over a time period was from the user).

In another representation, value 206 may be scaled to a set of values (e.g., 1, 2, 3, 4, or 5 based on 0-20%, 20-40%, etc., of total business over a time period). Each value in the set may correspond to a dollar range over a time period. The dollar range may be specific to the customer. For example, a '1' value for one customer may correspond to a different dollar range than another customer. Other representations (e.g., scaled values of 1-5, A-F, etc.) of historic value 206 may also be used without departing from the scope of this disclosure.

Trending value 204 may be a metric that is based on the trend line of business the user is conducting with the customer over a time period (e.g., over the course of a year there is a marked decline in the amount between the first quarter and last quarter). The trending value 204 may be represented in a variety of manner such as a percentage increase/decline over a time period. Thus, the trending value may be based on comparing a spending value of the user at a first portion of a time period to the spending value of the user at a second of the time period.

The trending value 204 may also be expressed as static, increasing, or decreasing. A more granular expression of the trending value 204 may indicate that if there is an increase, whether or not the increase itself is accelerating or is a linear increase (and similarly if there is a decrease).

Trending value 204 and historic value 206 are associated with actual amounts paid to the customer by the user. Thus, instead of or in addition to, the amount invoiced to a user, historic value 206 may represent the amount received from the customer over the time period.

Other values may be included in the plurality of values such as timeliness value. The timeliness value may be a metric that is based on when the user normally pays an amount due. The timeliness value may be expressed in days (e.g., a value of two may mean the user, on average, pays two days after a due date).

Figure 3:
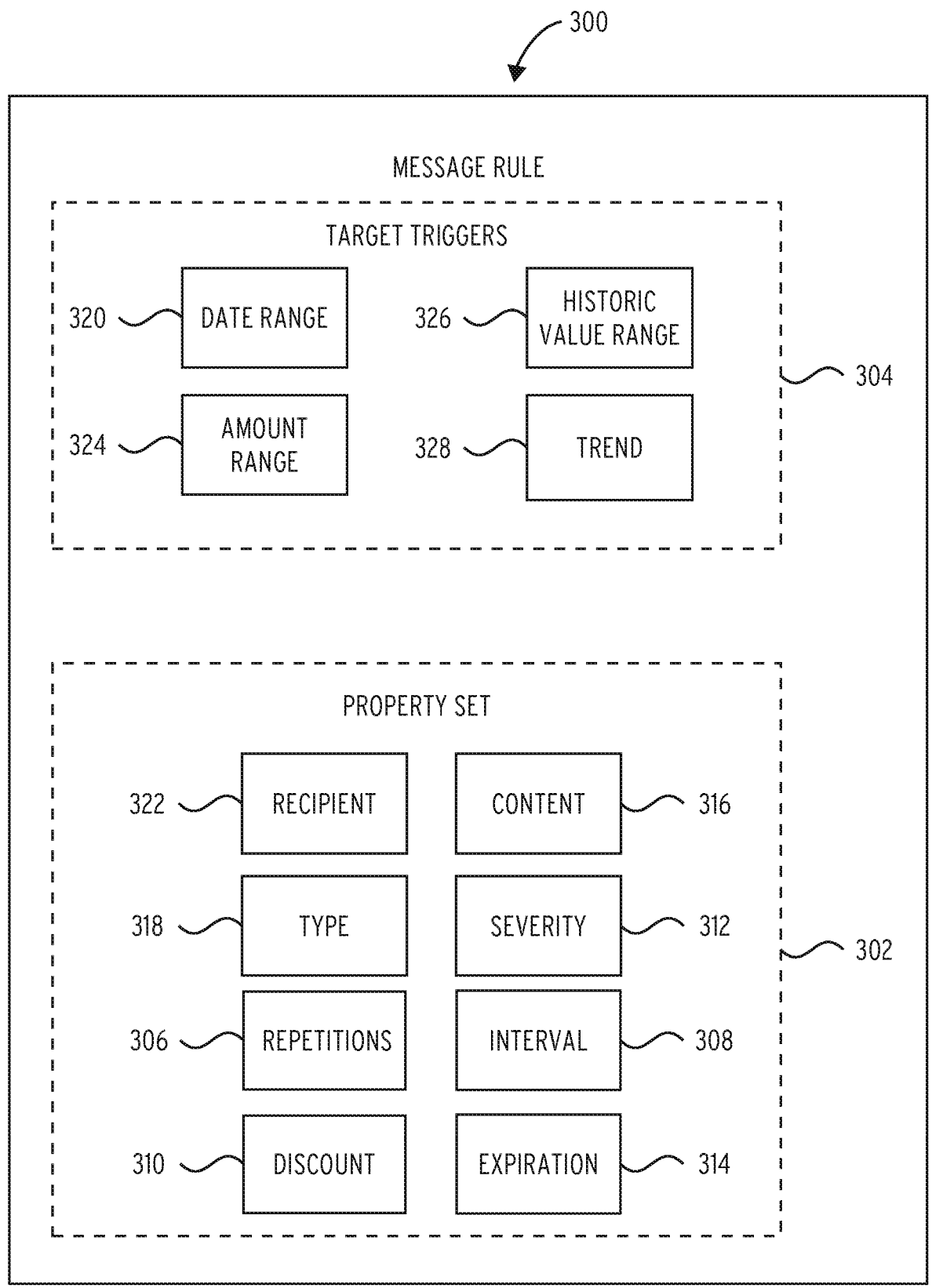
FIG. 3 is a schematic diagram of a message rule, according to various examples.

The data stored for each user in combination with the transaction details from customer servers 112 may be used to customize electronic message(s) for transmission to an individual user. For example, message rules may be generated and stored in the database 108. FIG. 3 illustrates a logical diagram of a message rule 300. The message rule 300 is illustrated as including two sections, target triggers 304 and property set 302. The target triggers 304 include a date range trigger 320, historic value trigger 326, amount range trigger 324, and trend trigger 328, in an example. The property set 302 is illustrated as including recipient setting 322, content setting 316, type setting 318, severity setting 312, repetitions setting 306, interval setting 308, discount setting 310, and expiration setting 314. Additional non-illustrated triggers and settings may be used in a message rule without departing from the scope of this disclosure as will be discussed in more detail below. A message rule does need not use all of the triggers or settings.

The target triggers 304 may be used to filter out documents (e.g., invoices) that do not meet the conditions of the target triggers. The property set associated with the target triggers of the message rule may then be applied to the remaining documents. A message rule does not need to use all of the target triggers 304. For example, a message rule may be set that targets all invoices of at least 50 dollars with no regard to how overdue an invoice may be. Additional target triggers may also be set that are not illustrated in FIG. 3 (as are discussed further herein).

Invoice details that meet the selected target triggers 304 may be gathered by executing one or more queries using a DBMS. By way of example, consider that the database 108 has two tables, an Invoice table and a User table. The Invoice table may have columns for Customer ID, user ID, due date, Invoice ID, and amount due. The User table may have columns for user ID, trending value, and historic value. The names and structure of the tables is for illustration purposes and other columns and structures may be used without departing from the scope of this disclosure Continuing the example, there be a message rule that targets invoices that are between 30 and 60 days overdue with an amount between $100-200 and with a user historic values of "2." Accordingly, an SQL query may be executed that gathers Invoice IDs and User IDs from the Invoice table for invoices that have due dates that are between the current date minus 30 and the current date minus 60 days AND with amounts between 100 and 200. An additional query may be run against the User Table to retrieve User IDs that have a historic value of '2.' Invoices from the first query that include a User ID in the results of the second query may be saved for later processing. The processing may including generating one or more electronic messages to the users associated with the User IDs with property sets according to the other part of the message rule.

With reference back to FIG. 3, the date range trigger 320 may be a value representing how overdue an invoice is (e.g., between 30-60 days overdue). The amount range trigger 324 may represent a dollar range of an individual invoice or the total amount overdue for a specific user. The historic value trigger 326 may represent the user's value to the customer. As discussed with respect to historic value 206, this value may take a number of forms.

Trend trigger 328 may represent the change in value (either the historic value or dollar amount of business from the user) to the customer over a time period. For example, one option for the trend trigger 328 may be a drop-down list of three options: (1) no trend; (2) trend up; and (3) trend down. There may be thresholds for each of these options such as no trend may be if the value has not changed more than 5% over the timer period (e.g., from the first quarter to the last quarter). The trend trigger 328 may include options for how the trend is calculated (e.g., moving average, linear, polynomial). Trend trigger 328 may include input boxes for the percentage change (e.g., a user may input a trend up of 10%).

In various examples, the property set 302 includes properties that may be applied to the electronic message 118. The recipient setting 322 and the type setting 318 may include options for types of messages to send and who to send the messages to. The recipient setting 322 includes options for internal recipients of the customer (e.g., accounts receivable, credit, sales) and type setting 318 (e.g., user e-mail, user text). The precise addresses/numbers may be determined when the electronic message 118 is transmitted by querying the database 108 for contact methods 210 of a user.

Collectively, the repetitions setting 306 and interval setting 308 may provide options for repeat sending of an electronic message. The message rule 300 may indicate that a message is supposed to be transmitted a total of three times (e.g., the repetitions setting 306) with five days between each transmission (e.g., the interval setting 308). To implement these settings, the database 108 may include a table of electronic messages. An entry in the table may store values for how many times a message has been transmitted, the date of last transmission, and days between transmissions.

The discount setting 310 and expiration setting 314 may indicate if a discount should be offered to the recipient and if there is an expiration date for the discount setting 310. A customer may offer a 10% discount to a user if the user pays within 10 days of receiving the electronic message 118. These two settings may be useful when used in conjunction with a participation trigger (not illustrated).

The participation trigger may be a percentage value indicating the number of users the customer believes will accept the discount. Consider the situation in which a customer projects a shortfall of X dollars in the next two weeks. Thus, to meet this shortfall the customer may be willing to provide a discount for paying in the next two weeks. However, the customer may not want to offer this discount to everyone. The message rule 300 may include a setting for the amount of money that needs to be raised to meet the expected shortfall amount.

As an illustration, consider that a customer is going to be 100 dollars short, each outstanding invoice is for 10 dollars, the participation projection is 80%, and a 10% discount is going to offered. Accordingly, the customer needs 12 people to accept the offer (e.g., 12*9=108). Thus, the offer needs to be sent to 15 people in order to get the 12 to accept. Furthermore, because there may be more than 15 people that meet the other target triggers 304 specified, when the rule is executed, the 15 may be randomly selected. In other examples, the pool of potential users is sorted by historic value to the customer (e.g., the top 15 in historic value may get the discounted offer).

The custom messaging system 102 may also track (e.g., by retrieving additional transaction details form customer servers 112) the actual participation rate and automatically transmit additional messages to previously non-selected users if it the rate is below the projected rate. Thus, if after a week only 20% (e.g., 3 of the original 15) of the recipients of the discounted offer have accepted, an additional 30 users may be offered the discount. Assuming the trend of 20% of acceptance per week, this would result in 12 total users accepting by the end of the two-week period—three more from the original 15 and nine from the new 30.

In various examples, a message rule that utilizes the participation projection trigger may be automatically generated by the custom messaging system 102 based analyzing business details for a customer. Consider the scenario where the custom messaging system 102 is offered by a bank with which the customer does business. Thus, the bank may have knowledge of the trend of expenditures and receivables for the customer. Accordingly, the bank may be able to predict that there will be a shortfall in the future and set up a rule to transmit messages to users with outstanding invoices for the customer.

The content setting 316 and severity setting 312 may work together to determine the actual language of a message that is transmitted to a user. The content setting 316 may be a script with one or more variables that are determined at the time of transmission. An example script may be "Hello, [CUSTOMER NAME]. This is a reminder that you have an overdue balance of [AMOUNT DUE] that is [DAYS PAST DUE]. If you pay within [EXPIRATION] days you are entitled to discount of [DISCOUNT] percent. [SEVERITY MESSAGE]." The severity message may be set according to the severity setting 312 such as low, medium, or high. Each of these may in turn have an associated message (e.g., a high setting may including a message that the account will be closed and the invoice will be sent to a collections agency).

The content setting 316 may include an option to include a link to facilitate transfer of an overdue balance. The link may be for a transfer of money via clearXchange using an e-mail address or phone number of the user.

One or more user interfaces may be used to populate values for the triggers and settings of the message rule 300. For example, the web server 104 may present (e.g., transmit) a web application (e.g., a web page) to computing device of a person associated with a customer (e.g., an accountant, manager, etc.). The web page may be rendered on the computing device and include input mechanisms to store values for the triggers and settings for a message rule. The input mechanisms may include, but are not limited to one or more web forms, input boxes, sliders, radio buttons, drop-down menus, checkboxes, toggles, and date and time pickers (an example user interface is presented in FIG. 4).

Figure 4:
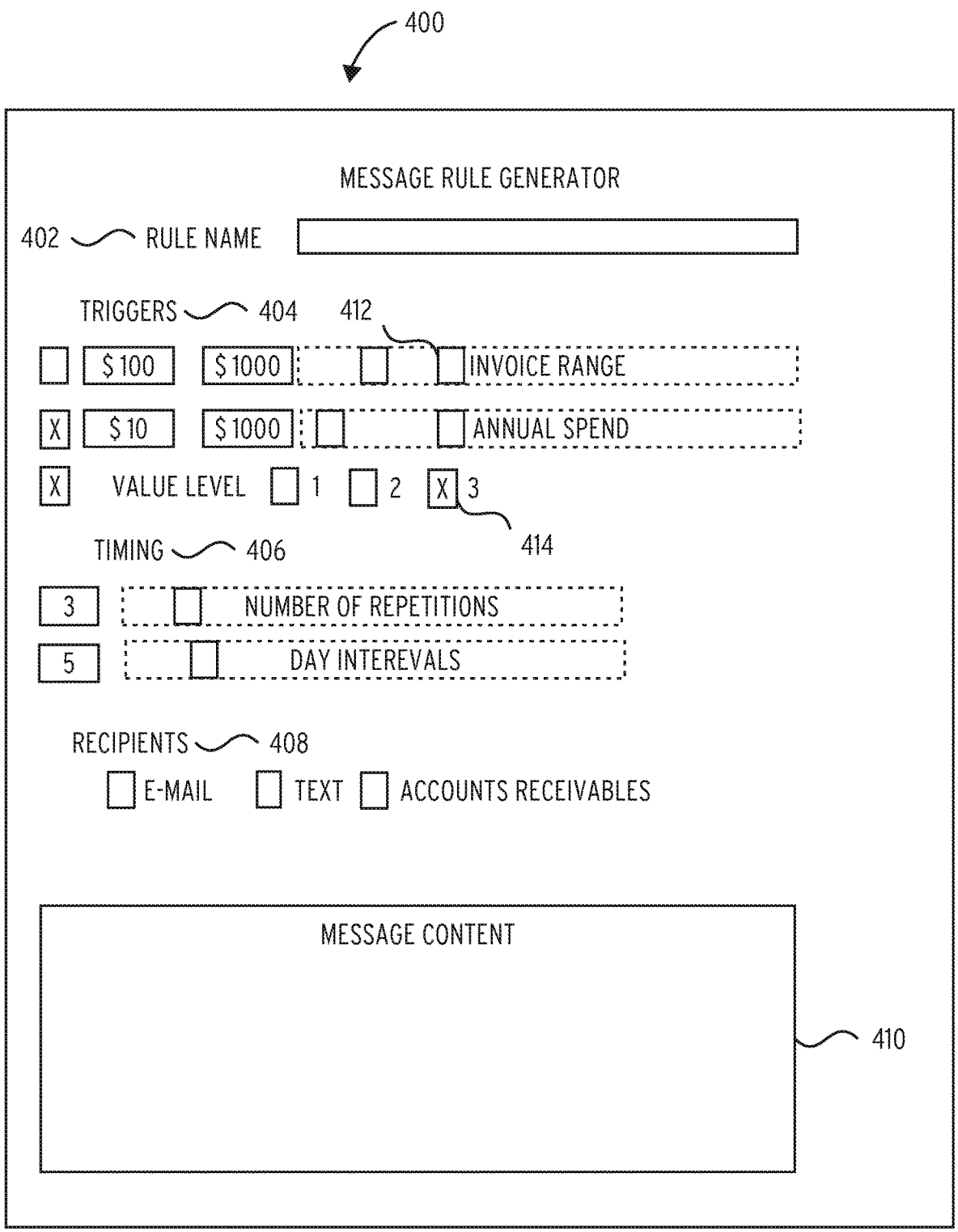
FIG. 4 is a user interface for generating a message rule, according to various examples.

FIG. 4 illustrates a user interface 400 for generating a message rule. The interface 400 includes a name setting 402, trigger settings 404, timing properties 406, recipient properties 408, and message content 410. Also illustrated are a variety of user interface elements such as slider element 412 and checkbox 414. The slider elements may be used to quickly adjust ranges instead of manually typing in the amounts. As can be seen, many of the settings and triggers discussed with respect to FIG. 3 are not illustrated; however these settings/triggers may be presented in the user interface in further examples.

The result of using an interface such as in FIG. 4 is a message rule that may be saved in database 108. A customer may generate multiple message rules and edit previously generated rules. Web server 104 may present a search interface that allows someone to search by name or rule message ID. Furthermore, the custom messaging system 102 may have default rules that the customer may use as-is or edit. Additionally, there may be a default rule that is used for invoices that do not match any of the other message rules in the database 108.

A method of using the message rules may include retrieving all message rules for a customer. The database may be queried using the triggers for the message rules to retrieve matching documents. A priority level may be set for a message rule that may be used as a tiebreaker if a document matches more than one message rule. Then, the property set for the message rule may be applied to an electronic message for transmission to one or more users.

A message rule does not need to be directed towards invoice repayment. The message content 410 may be a message that is transmitted when the custom messaging system 102 detects a change in a user's spending habits. For example, the transaction details for a user may be analyzed (e.g., using one or more processors the of the custom messaging system 102) to determine a trend in spending with a customer. The trend may be stored as a percentage change over a time period. A message rule 300 may be generated that with a trigger than transmits a message to the user if the percentage hits a certain threshold (e.g., drops 10% on a year-over-year basis). The transaction details may also be analyzed to determine irregular spending habits.

Beyond a general trend, an irregular spending pattern may be determined by looking at when a user spends money on a day-to-day or month-to-month basis. For example, a trigger may include a deviation of more than two purchases for time period (e.g., the user generally has five transactions a week and is now at three). The discount setting 310 may also be tied to the spending pattern such as by offering a 10% discount a deviation if there are more than two deviations between time periods.

Figure 5:
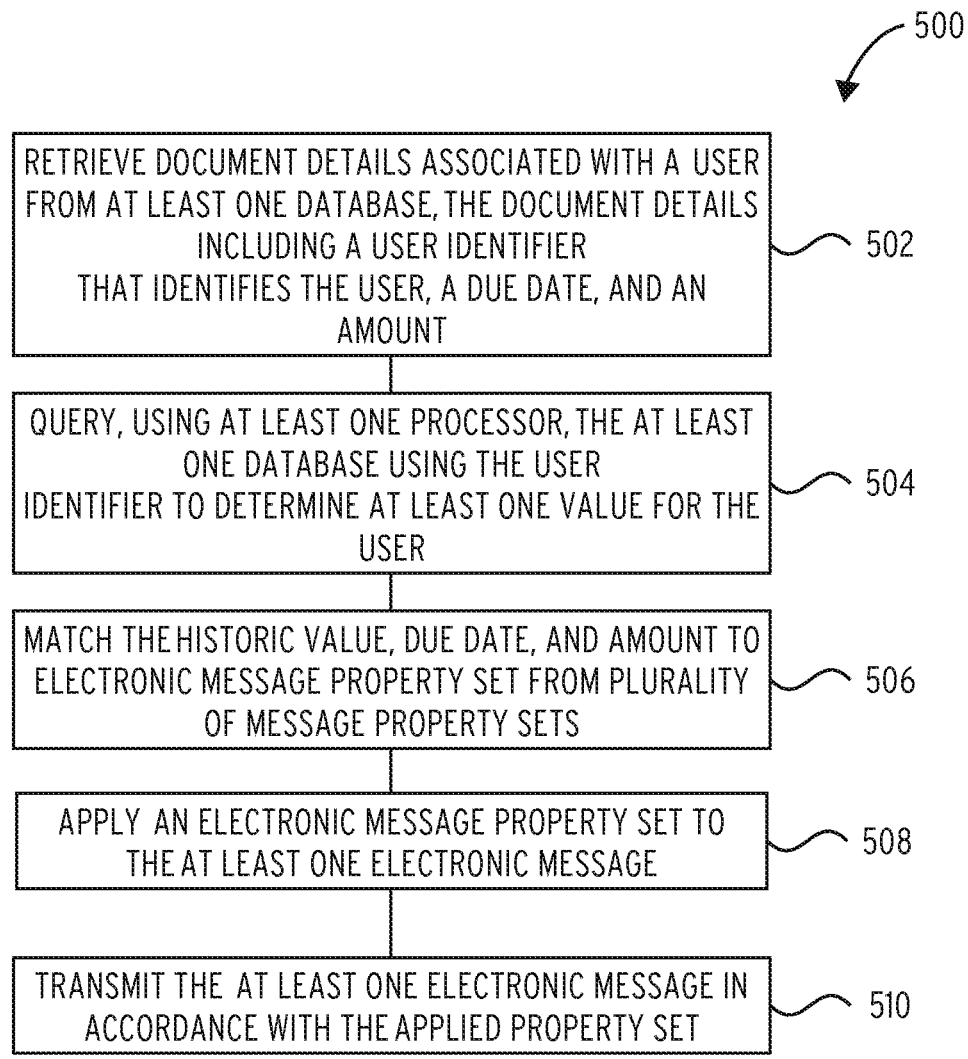
FIG. 5 illustrates a method to customize an electronic message, according to various examples.

FIG. 5 illustrates a method 500 to customize an electronic message, according to various examples. The method 500 may be performed by any of the modules, logic, or components described herein. In an example, at block 502, document details associated with a user are retrieved from at least one database stored on a storage device. For example the document may be an invoice as it relates to an entity (e.g., a business). The document details may a user identifier that identifies the user, a due date, and an amount.

In an example, at block 504, the at least one database is queried using the user identifier to determine at least one value for the user, the at least one value including a historic value. In some embodiments, the historic value is based on a total amount spent by the user over a time period with respect to an entity. In some examples, the historic value may be a representation (e.g., 1, 2, 3) of value to the entity for the user as described above.

In some examples, the at least one value may include a trending value based on comparing a spending value of the user at a first portion of a time period to the spending value of the user at a second portion of the time period. In some embodiments, the method 500 may further include matching the trending value to a trending value trigger of the electronic message property set.

In an example, at block 506, the historic value, due date, and amount are matched to an electronic message property set from a plurality of message property sets. For example, the historic value, due date, and amount may be matched to triggers of a message rule. The at least one database may be queried to retrieve a message rule that has triggers that are within the range of the historic value, due date, and amount. The priority level of a message rule may be used if more than message rule is matched.

In various example, matching may include calculating an amount of days past the due date and matching the amount of days past the due date to a due date range trigger of the electronic message property set. In an example, matching may include matching the historic value to a historic value trigger of the electronic message property set. In an example, matching may include matching the trending value to a trending value trigger of the electronic message property set.

In an example, the electronic message property set for the message rule may be retrieved. The electronic message property may include, properties of: a message content, a number of repetitions for transmission of the electronic message, an interval between repetitions of transmission, and a type of electronic message.

In block 508, the electronic message property set may be applied to at least one electronic message. Applying the electronic message property set may include generating an electronic message in accordance with the property set. For example, the content of the message may be determined and the recipients of the message may be determined. Applying may also include a transmission date to send the message. For example, if the message is to be transmitted three times, the dates of each transmission may be determined according to the interval setting in the property set. In block 510, the at least one electronic message may be transmitted in accordance with the applied property set (e.g., to the set recipients at a scheduled time).

Figure 6:
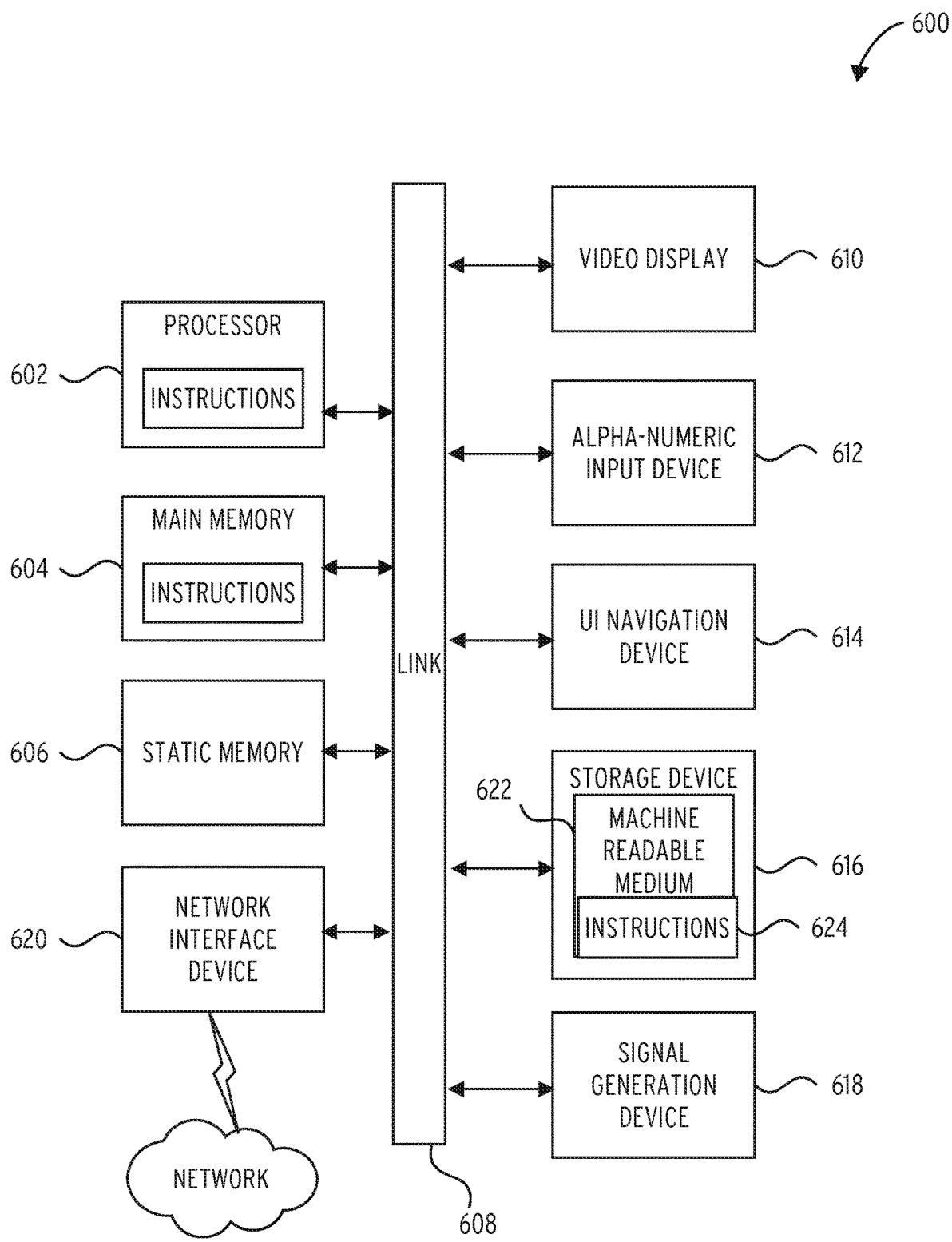
FIG. 6 is a block diagram of a machine in the example form of a computer system within which a set of instructions, for causing the machine to perform any one or more of the methodologies discussed herein, may be executed.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method comprising:
    retrieving document details associated with a user from at least one database stored on a storage device, the document details including a user identifier that identifies the user and an amount due;
    querying, using at least one processor, the at least one database using the user identifier to determine a plurality of values; the plurality of values including a trending value and a historical value separate from the amount due;
    matching the historical value, trending value, and amount due to an electronic message property set from a plurality of message property sets;
    applying the electronic message property set to at least one electronic message; and
    transmitting the at least one electronic message in accordance with the applied electronic message property set.

2. The method of claim 1, wherein the plurality of values includes a timeliness value.

3. The method of claim 1, wherein the historical value is a relative value of the user within a plurality of users.

4. The method of claim 1, wherein the trending value indicates whether the user has no trend, is trending up, or is trending down.

5. The method of claim 1, wherein the electronic message property set includes a discount setting.

6. The method of claim 5, wherein the discount setting is based on a participation trigger of the electronic message property set.

7. The method of claim 5, wherein the discount setting is based on acceptance of other users of previously transmitted electronic messages with discounts.

8. A computing apparatus comprising:
    a processor; and
    a memory storing instructions that, when executed by the processor, configure the apparatus to:
        retrieve document details associated with a user from at least one database stored on a storage device, the document details including a user identifier that identifies the user and an amount due;
        query, using at least one processor, the at least one database using the user identifier to determine a plurality of values, the plurality of values including a trending value and a historical value separate from the amount due;
        match the historical value, trending value, and amount due to an electronic message property set from a plurality of message property sets;
        apply the electronic message property set to at least one electronic message; and
        transmit the at least one electronic message in accordance with the applied electronic message property set.

9. The computing apparatus of claim 8, wherein the plurality of values includes a timeliness value.

10. The computing apparatus of claim 8, wherein the historical value is a relative value of the user within a plurality of users.

11. The computing apparatus of claim 8, wherein the trending value indicates whether the user has no trend, is trending up, or is trending down.

12. The computing apparatus of claim 8, wherein the electronic message property set includes a discount setting.

13. The computing apparatus of claim 12 wherein the discount setting is based on a participation trigger of the electronic message property set.

14. The computing apparatus of claim 12, wherein the discount setting is based on acceptance of other users of previously transmitted electronic messages with discounts.

15. A non-transitory computer-readable storage medium, the computer-readable storage medium including instructions that when executed by a computer, cause the computer to
    retrieve document details associated with a user from at least one database stored on a storage device, the document details including a user identifier that identifies the user and an amount due;
    query, using at least one processor, the at least one database using the user identifier to determine a plurality of values, the plurality of values including a trending value and a historical value separate from the amount due;
    match the historical value, trending value, and amount due to an electronic message property set from a plurality of message property sets;
    apply the electronic message property set to at least one electronic message; and
    transmit the at least one electronic message in accordance with the applied electronic message property set.

16. The computer-readable storage medium of claim 15, wherein the plurality of values includes a timeliness value.

17. The computer-readable storage medium of claim 15, wherein the historical value is a relative value of the user within a plurality of users.

18. The computer-readable storage medium of claim 15, wherein the trending value indicates whether the user has no trend, is trending up, or is trending down.

19. The computer-readable storage medium of claim 15, wherein the electronic message property set includes a discount setting.

20. The computer-readable storage medium of claim 19, wherein the discount setting is based on a participation trigger of the electronic message property set.

* * * * *

UNITED STATES PATENT AND TRADEMARK OFFICE
CERTIFICATE OF CORRECTION

| | |
|---|---|
| PATENT NO. | : 11,349,789 B1 |
| APPLICATION NO. | : 16/948190 |
| DATED | : May 31, 2022 |
| INVENTOR(S) | : Matthew J. Heffron |

It is certified that error appears in the above-identified patent and that said Letters Patent is hereby corrected as shown below:

On the Title Page

On page 2, in Column 1, under "U.S. Patent Documents", Line 25, delete "2016/0025391" and insert --2016/0253910-- therefor In the Claims In Column 11, Line 39, in Claim 1, delete "values;" and insert --values,-- therefor In Column 12, Line 27, in Claim 13, after "claim 12", insert --,--

In Column 12, Line 36, in Claim 15, after "to", insert --:--

Signed and Sealed this
Twenty-eighth Day of March, 2023

Katherine Kelly Vidal
*Director of the United States Patent and Trademark Office*